(12) United States Patent
Smith

(10) Patent No.: US 7,946,193 B2
(45) Date of Patent: May 24, 2011

(54) FOOT PEG WITH REPLACEABLE CLEAT COMPONENT

(75) Inventor: Brad Smith, Whitehouse, TX (US)

(73) Assignee: Ed Tucker Distributor, Inc., Fort Worth, TX (US)

( * ) Notice: Subject to any disclaimer, the term of this patent is extended or adjusted under 35 U.S.C. 154(b) by 0 days.

(21) Appl. No.: 11/444,000

(22) Filed: May 31, 2006

(65) Prior Publication Data

US 2007/0289404 A1    Dec. 20, 2007

(51) Int. Cl.
*G05G 1/60* (2008.04)
*B62M 3/00* (2006.01)
*B62J 25/00* (2006.01)
*B60N 3/06* (2006.01)

(52) U.S. Cl. ............ 74/564; 74/594.4; 280/291; 296/75

(58) Field of Classification Search ............ 74/563, 74/564, 594.4; 280/291; D12/114; 296/75; 297/423.25, 423.42; *G05G 1/18; B62J 25/00*
See application file for complete search history.

(56) References Cited

U.S. PATENT DOCUMENTS

| | | | |
|---|---|---|---|
| 260,114 A | | 6/1882 | Murray |
| 533,180 A | * | 1/1895 | Perkins ..................... 74/594.4 |
| 579,479 A | | 3/1897 | Goebler |
| 959,160 A | | 5/1910 | Pawsat |
| 973,065 A | | 10/1910 | Pawsat |
| 2,542,548 A | | 2/1951 | Matthias et al. |
| D282,652 S | | 2/1986 | Nista |
| 5,673,597 A | | 10/1997 | Lin |
| 5,806,379 A | | 9/1998 | Nagano |
| D408,535 S | | 4/1999 | Hacker |
| 6,390,488 B1 | | 5/2002 | Wallingsford |
| D488,407 S | | 4/2004 | Wright |
| D489,295 S | | 5/2004 | Wright |
| D524,194 S | * | 7/2006 | Claussen ..................... D12/114 |
| 2002/0158441 A1 | | 10/2002 | Essinger |
| 2007/0272050 A1 | * | 11/2007 | Barnett .......................... 74/564 |

FOREIGN PATENT DOCUMENTS

EP    1 842 768 A2  * 10/2007
WO   WO-9937527 A1    7/1999

OTHER PUBLICATIONS

Fastway F3 Lowboy Footpegs, Transworld Motorcross, 2004 www.transworldmotorcross.com/mx/product_reviews/article/0,13190,343657,00.html.*

(Continued)

*Primary Examiner* — Vinh T. Luong
(74) *Attorney, Agent, or Firm* — Gardere Wynne Sewell, LLP

(57) ABSTRACT

An multi-piece foot peg for use with power sport vehicles such as motorcycles and ATVs is provided that, in one embodiment, includes a base that attaches to the frame of the vehicle and a cleat member that attaches to the base wherein the cleat member may be replaced without replacing the entire foot peg thereby enabling economical replacement of worn cleats and enabling the adjustment of foot peg height and aggressiveness of the cleats. The base is configured to define an opening between two sub-components that extend away from the frame of the vehicle. The cleat member includes cleats and at least one opening between the cleats positioned to facilitate the passage of debris through the opening in the cleat member and through the opening in the base such that debris will not build up on the upper surface of the cleat member.

28 Claims, 16 Drawing Sheets

OTHER PUBLICATIONS

International Search Report for Co-Pending PCT Application No. PCT/US2007/069893 Issued Jul. 11, 2008.
Written Opinion for Co-Pending PCT Application No. PCT/US2007/069893 Issued Jul. 11, 2008.
International Search Report for Co-Pending PCT Application No. PCT/US2007/070135 Issued Dec. 27, 2007.
Written Opinion for Co-Pending PCT Application No. PCT/US2007/070135 Issued Dec. 27, 2007.
Office Action for Co-Pending Chinese Application No. 200780024634.9 Issued Sep. 30, 2010, 24 pgs.
European Search Report for Co-Pending European Application No. 07797847.6.
Australian First Examination Report for Co-Pending Australian Application No. 2007266524 Dated Jun. 22, 2010, 19 pgs.
Australian Second Examination Report for Co-Pending Australian Application No. 2007266524 Dated Oct. 1, 2010, 1 pg.

* cited by examiner

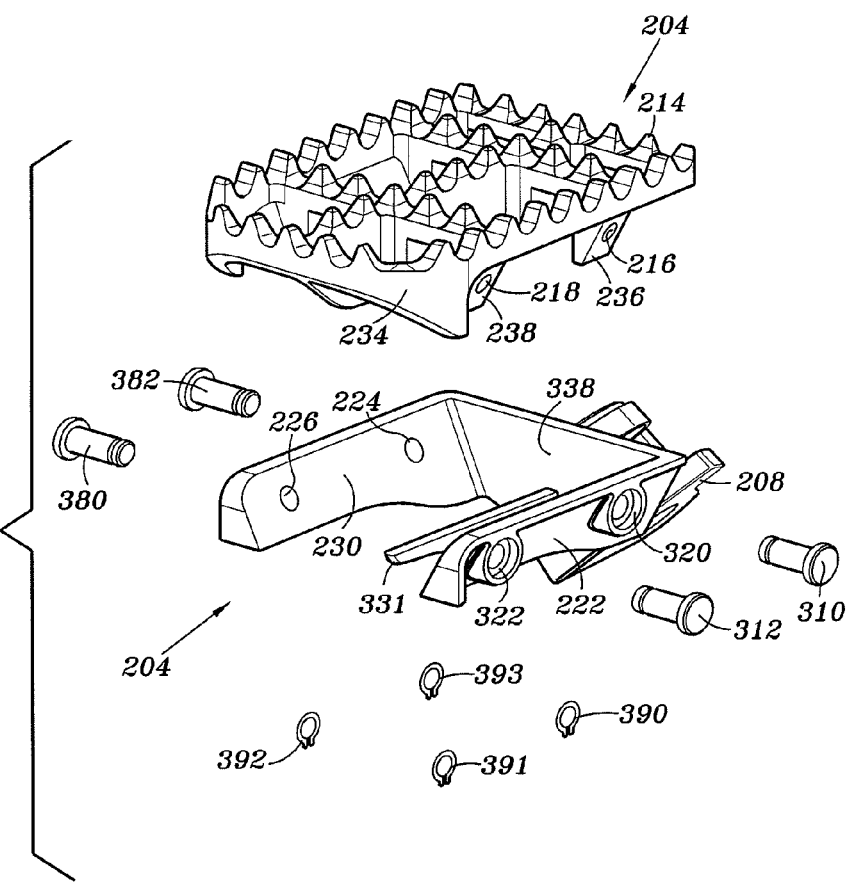

FOOT PEG WITH REPLACEABLE CLEAT COMPONENT

TECHNICAL FIELD OF THE INVENTION

This invention relates in general to the field of vehicles and, more particularly to foot pegs for use on motorcycles, all terrain vehicles, and similar vehicles.

BACKGROUND OF THE INVENTION

Motocross motorcycles and many other similar vehicles, such as, for example, small motorized three and four wheel vehicles commonly referred to as All Terrain Vehicles (ATVs), have foot pegs that extend out from the body of the vehicle that allow a rider to stand and support himself when riding. These foot pegs typically contain a cleated surface that provide the rider with greater grip and traction than would otherwise be available thereby helping to prevent the rider's foot from inadvertently slipping off of the foot peg.

As the cleated surface of the foot pegs wear down over time, the traction provided to the rider is lessened. Therefore, it is common that the foot peg must be replaced with a new one in order to provide the rider with a foot peg with suitable traction necessary for the off road riding typically associated with these types of vehicles. However, the process of replacing the foot peg is somewhat cumbersome, time consuming, and uneconomical since the entire foot peg must be replaced. Furthermore, riders often desire to adjust the height of the foot peg, the type of cleat pattern, or the aggressiveness of the shape of the cleats to better suit the preferences of the rider or to better suit the riding conditions. As mentioned above, currently available foot pegs require that the entire foot peg be replaced. This is both uneconomical and time consuming.

SUMMARY OF THE INVENTION

The present invention presents the rare opportunity to create an entirely new foot peg for use in power sport vehicles that does not suffer from the disadvantages, limitations, and problems mentioned above. From the foregoing it may be appreciated that a need has arisen for an improved foot peg in which the cleated surface may be replaced without replacing the entire foot peg thereby allowing for economical and quick replacement of worn cleats and for replacement of cleats with different types of cleats in order to adjust the height and/or grip of the foot peg to suit the requirements and/or preferences of the rider and/or conditions of the riding surface.

According to one aspect of the invention, a foot peg for use on motor sport vehicles such as motorcycles and ATVs is provided that includes a base component and a cleat component. The base component has a first base member, a second base member, and a third base member, wherein the first base member is configured to attach the base component to the vehicle, the second and third base members extend from the first base member away from the vehicle, and the second and third base members extend away from each other such that the second and third base members define a space between at least a part of the second and third base members sufficiently large to allow debris to fall there through. The cleat component includes a plurality of cleats to provide a grippable surface upon which a rider may place a foot and an attaching member for attaching the cleat component to the base component. The plurality of cleats are arranged such that at least one opening is defined between the plurality of cleats. The opening is sufficiently large such that debris may fall there through. At least a portion of the opening aligns with the space between the second and third base members such that debris falling through the opening may also fall through the space. The cleat component may be replaced without removal of the base component from the vehicle.

According to another aspect of the invention, a power sport vehicle, such as, for example, a motorcycle or an ATV, is provided that includes a support member for supporting a rider, at least one wheel functionally attached to the support member, and a foot peg attached to the support member. The foot peg includes a base component and a cleat component. The base component also has a first base subcomponent, a second base subcomponent, and a third base subcomponent, wherein the first base subcomponent is configured to attach the base component to the vehicle and the second and third base subcomponents extend from the first base member away from the vehicle such that the second and third base subcomponents define a space between at least a part of the second and third base subcomponents sufficiently large to allow debris to fall there through. The cleat component includes a plurality of cleats to provide a grippable surface upon which a rider may place a foot and an attaching subcomponent for attaching the cleat component to the base component. The plurality of cleats are arranged such that at least one opening is defined between the plurality of cleats. The opening is sufficiently large such that debris may fall there through and at least a portion of the opening aligns with the space between the second and third base subcomponent such that debris falling through the opening may also fall through the space. The cleat component may be replaced without removal of the base component from the vehicle.

According to yet another aspect of the present invention, a foot peg is provided that includes a base component comprising means for attaching the foot peg to a power sport vehicle, such as, for example, a motorcycle or ATV, and a detachable cleat component. The base component defines an opening and the detachable cleat component comprises a plurality of cleats defining at least one hole therethrough. The hole and the opening in the base component align sufficiently to allow debris to fall from an upper surface of the cleat component through the foot peg so as to inhibit build up of debris on the upper surface of the cleat component. The foot peg also includes means for attaching the detachable cleat component to the base component.

According to yet another aspect of the present invention, a foot peg is provided that includes a base component and a removable cleat component. The base component includes a vehicle attachment component and comprises a shape defining at least one first opening sufficient in size for debris to fall therethrough. The removable cleat component comprises a plurality of cleats arranged such that at least one second opening of sufficient size for debris to fall through is defined therebetween. The removable cleat component is mechanically attached to the base component and the removable cleat component is configured such that the removable cleat component may be replaced without removal of the base component from the frame of a power sport vehicle.

BRIEF DESCRIPTION OF THE DRAWINGS

For a more complete understanding of the present invention and the advantages thereof, reference is now made to the following brief description, taken in connection with the accompanying drawings and detailed description, wherein like reference numerals represent like parts, in which:

FIGS. 10A-10C show various views of an exemplary foot peg with pins used for attaching the cleat component to the base component in accordance with one embodiment of the present invention;

DETAILED DESCRIPTION OF THE INVENTION

Figure 1:
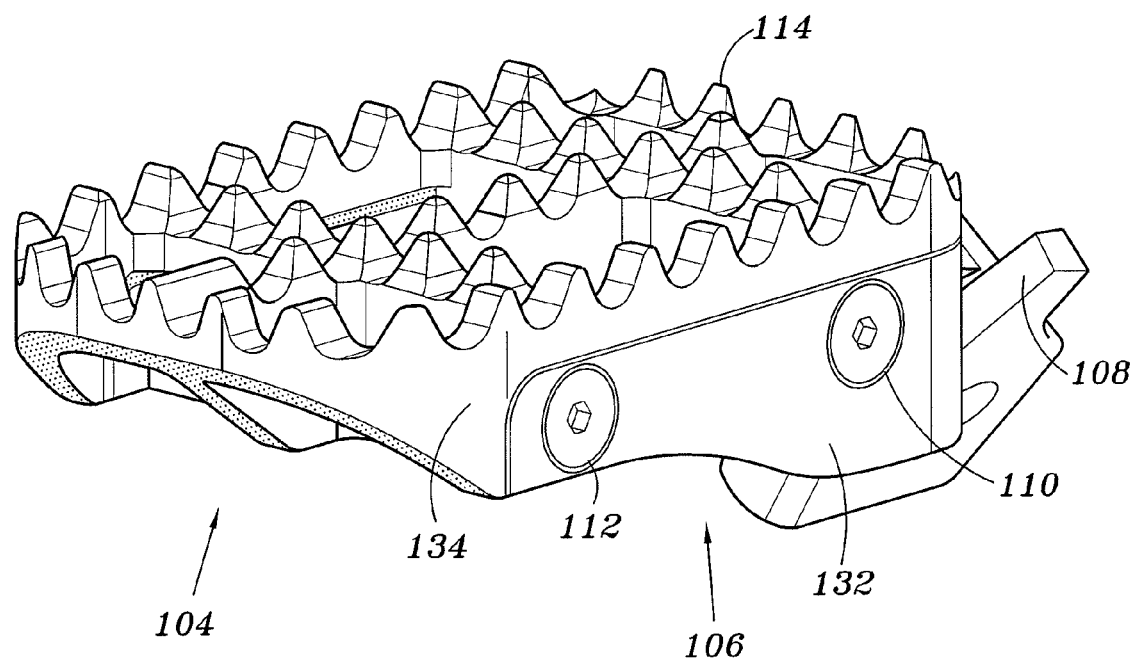
FIG. 1 is a perspective view of an exemplary multi-piece foot peg having a base and removable cleat component is depicted in accordance with one embodiment of the present invention.

It should be understood at the outset that although an exemplary implementation of the present invention is illustrated below, the present invention may be implemented using any number of techniques, whether currently known or in existence. The present invention should in no way be limited to the exemplary implementations, drawings, and techniques illustrated below, including the exemplary design and implementation illustrated and described herein. Additionally, the drawings contained herein are not necessarily drawn to scale. Like reference numerals refer to like and similar components throughout the application.

Figure 2:
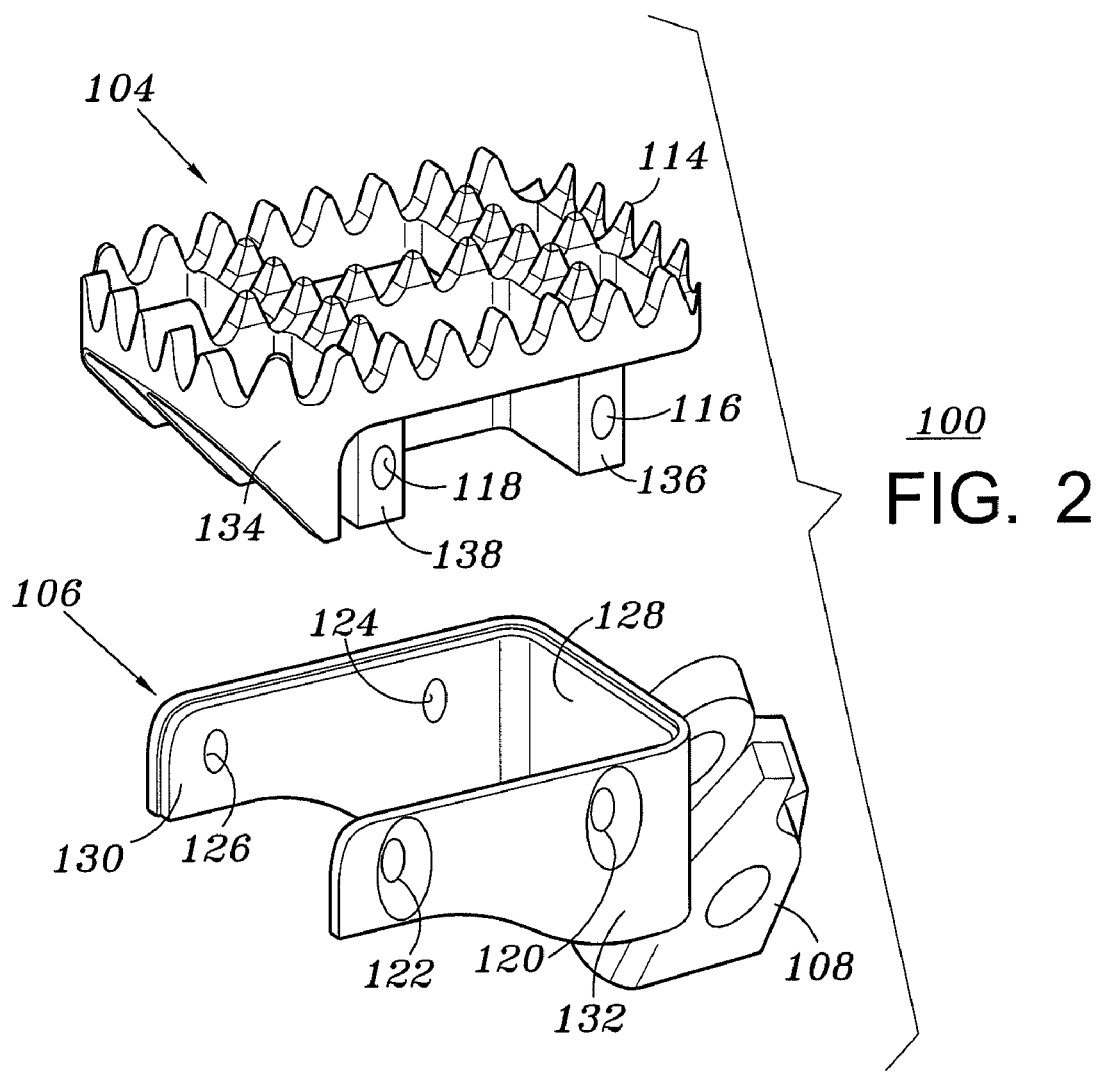
FIG. 2 is an exploded perspective view of the foot peg depicted in FIG. 1 in accordance with one embodiment of the present invention.
Figure 3:
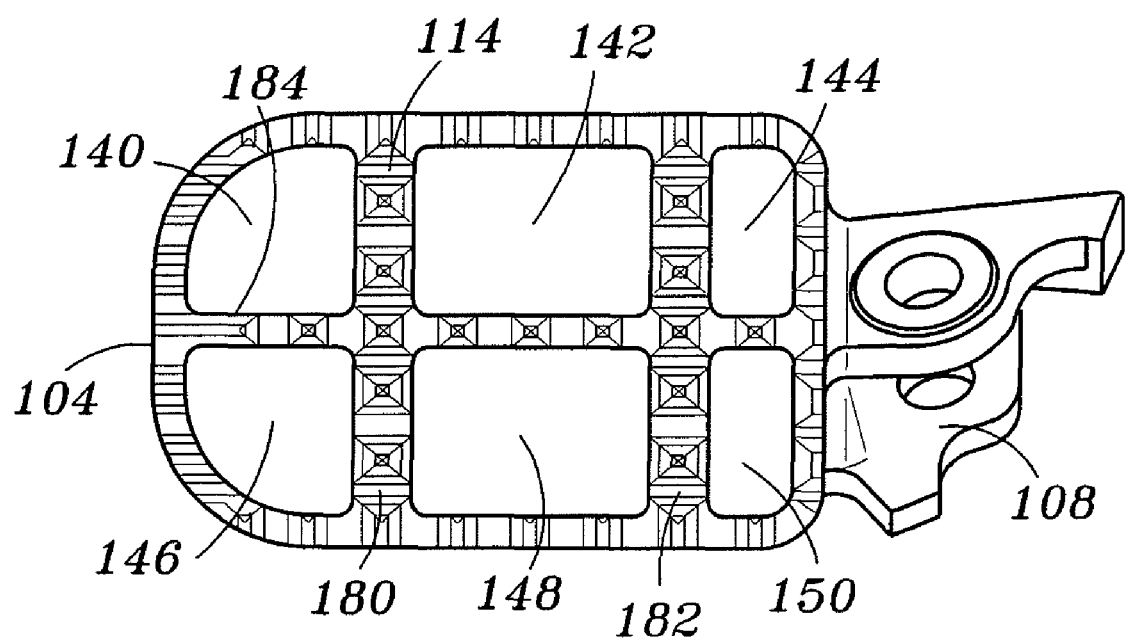
FIG. 3 is a top view of the foot peg depicted in FIG. 1 in accordance with one embodiment of the present invention.
Figure 4:
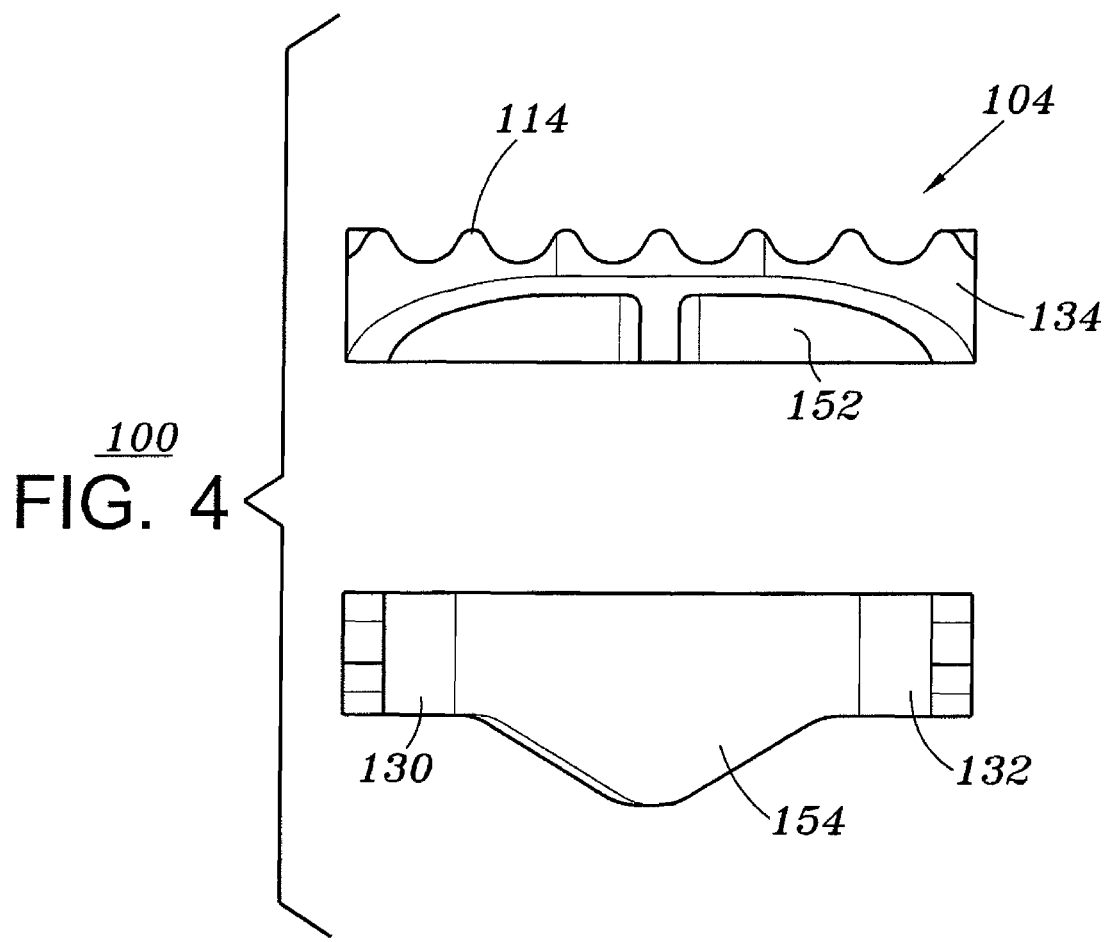
FIG. 4 is a front exploded view of the foot peg depicted in FIG. 1 in accordance with one embodiment of the present invention.
Figure 5:
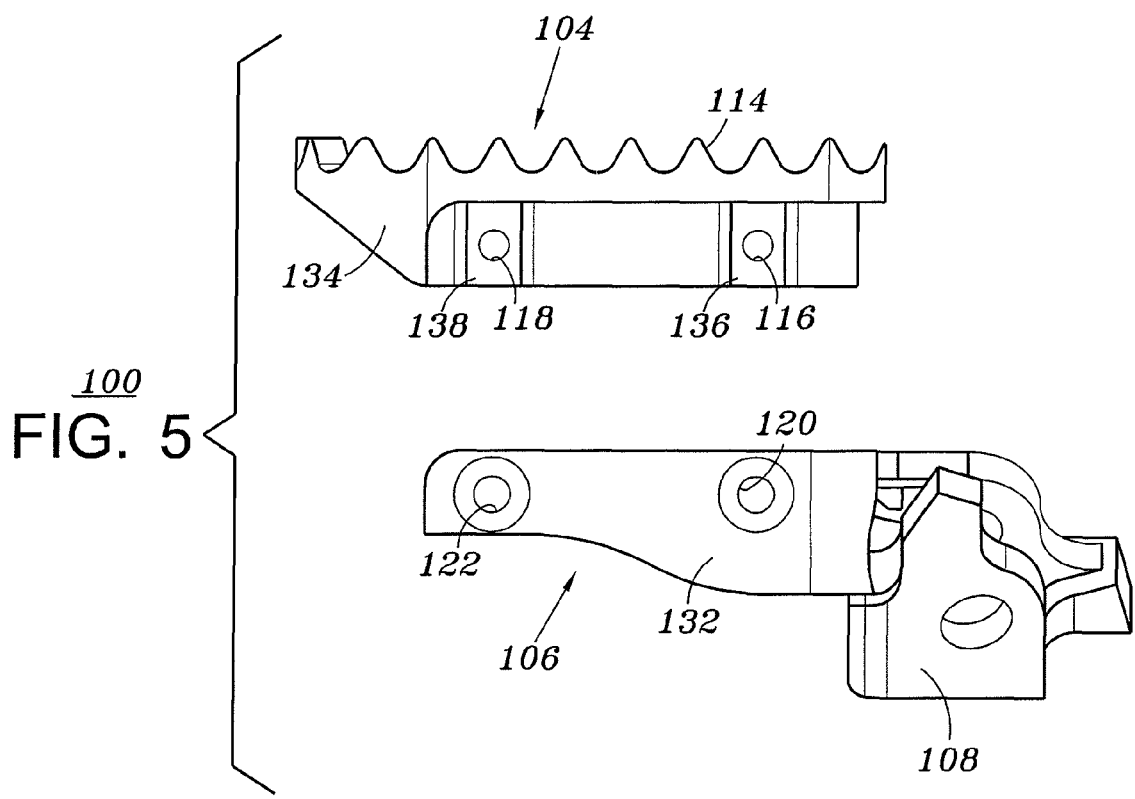
FIG. 5 is an side exploded view of the foot peg depicted in FIG. 1 in accordance with one embodiment of the present invention.
Figure 6:
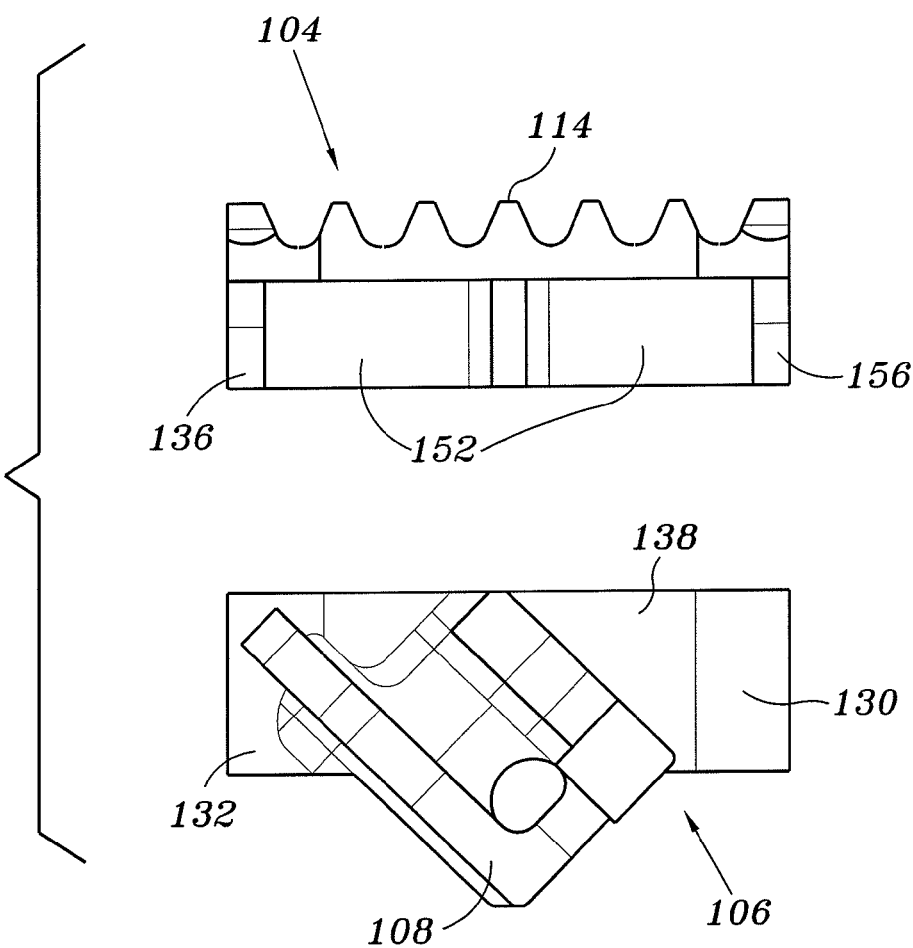
FIG. 6 is a back exploded view of the foot peg depicted in FIG. 1 in accordance with one embodiment of the present invention.
Figure 7:
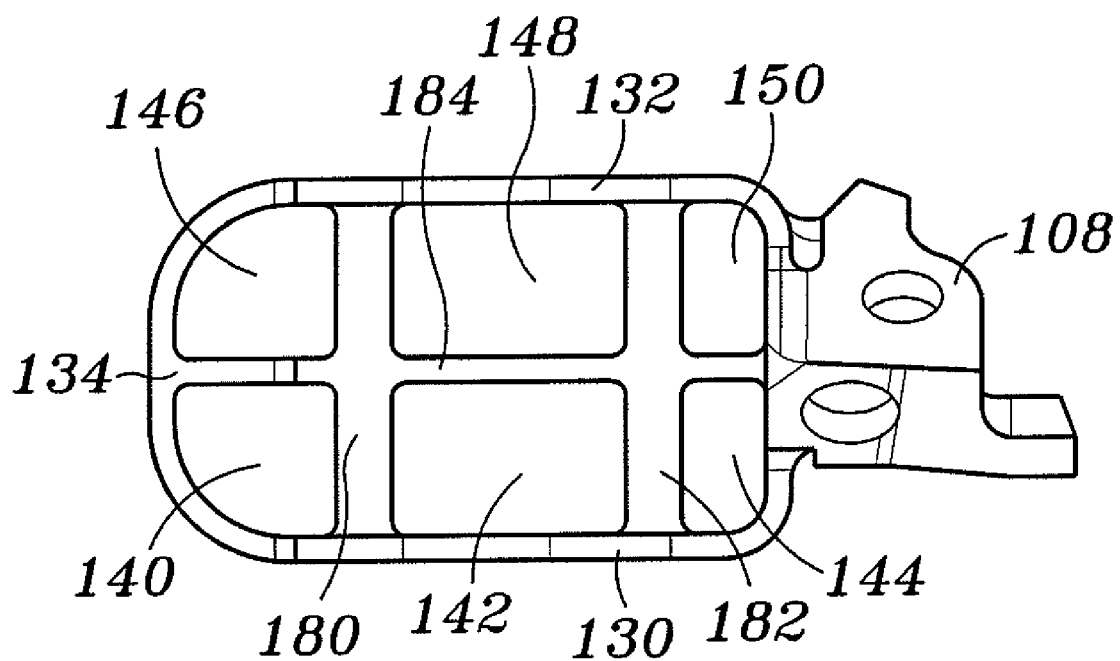
FIG. 7 is a bottom view of the foot peg depicted in FIG. 1 in accordance with one embodiment of the present invention.

With reference now to the figures, and in particular with reference to FIGS. 1-7. FIG. 1 is a perspective view of an exemplary multi-piece foot peg 100 having a base and removable cleat component in accordance with one embodiment of the present invention. FIG. 2 is an exploded perspective view of foot peg 100 in accordance with one embodiment of the present invention. FIG. 3 is a top view of foot peg 100 in accordance with one embodiment of the present invention. FIG. 4 is a front exploded view of foot peg 100 in accordance with one embodiment of the present invention. FIG. 5 is an side exploded view of foot peg 100 in accordance with one embodiment of the present invention. FIG. 6 is a back exploded view of foot peg 100 in accordance with one embodiment of the present invention and FIG. 7 is a bottom view of foot peg 100 in accordance with one embodiment of the present invention.

Foot peg 100 includes a base component 106 and a cleat component 104. The base component 106 includes first and second side support members 130 and 132 as depicted in FIG. 2 that are connected to each other via base support member or first base subcomponent 128 such that an open space is defined between first and second side support members or second and third base subcomponents 130 and 132. Base support member 128 also connects the first and second side support members 130 and 132 to a vehicle mounting member 108. The vehicle mounting member 108 provides means for mounting the foot peg 100 onto a vehicle such as, for example, an off-road motorcycle or a small vehicle commonly referred to as an All Terrain Vehicle (ATV). The size and shape of the vehicle mounting member 108 varies depending on the make and type of vehicle to which the foot peg 100 is attached. The base component 106 in the depicted example includes holes 120, 122, 124, and 126 through first and second side support members 130 and 132 allowing for the cleat component 104 to be attached to based component 106 via, for example, screws 110 and 112 and other screws not shown, extending through first and second side support members 130 and 132 and into holes 116 and 118 provided in cleat attachment members 136 and 138 and into holes not shown on the opposite side from those depicted. Bolts and pins may also be utilized to attach the cleat component 104 to the base component 104.

The cleat component 104 comprises a plurality of cleats 114 arranged over the top surface of the cleat component 104 such that support for a rider's foot is provided. Open spaces 140, 142, 144, 146, 148, and 150 are provided between various ones of the plurality of cleats 114 and are defined by cleat cross members 180, 182, and 184. Open spaces 140, 142, 144, 146, 148, and 150 are of a sufficient size such that debris from a rider's foot or elsewhere may fall through the open spaces 140, 142, 144, 146, 148, and 150 and through the opening between first and second side support elements 130 and 132 thereby preventing or inhibiting the buildup of debris on the top surface of the foot peg 100 such that a better surface for supporting a rider is provided. In some embodiments, at least one dimension defining the area of an open space such as, for example, one of open spaces 140, 142, 144, 146, 148, and 150, is greater than or equal to approximately ¼ inch in order to provide ample room for debris to fall through. The shape of open spaces 140, 142, 144, 146, 148, and 150 may be varied and may encompass many different shapes including but not limited to the shapes depicted in FIGS. 1-7.

Cleat cross members 180, 182, and 184 include a plurality of cleats 114 that extend upward from a top surface of cleat component 104. The widths and thicknesses of the cleat cross members 180, 182, and 184 are implementation dependant and may vary depending on such factors as, for example, fabrication material, vehicle type and/or intended riding conditions. However, in many embodiments, the widths and thicknesses of the cleat members 180, 182, and 184 are generally sufficient to provide mechanical support for a rider's foot under typical forces experienced by a rider of motorcycles and all terrain vehicles in most riding conditions.

In one embodiment, foot peg 100 includes a lip member 134 that is a part of the cleat member 104. Lip member 134 extends out and down over the ends of foot peg component 106 side support members 130 and 132. Lip member 134 may aid in aligning the cleat component 104 to the base component 106 when replacing the cleat component 104.

The cleats 114 may vary in height, shape, spacing and number depending on implementation. Thus, in some embodiments, the cleats' 114 shape may be more pointy or spiky to provide a more aggressive grip for a rider's foot while in other embodiments, the cleats' 114 shape may be more rounded or squared off in order to provide a surface from which it may be easier for a rider to remove his/her foot. Furthermore, different types of cleats 114 may be preferred by different riders and riders may prefer different types of cleats 114 for differing ride conditions. Thus, for example, a rider may prefer one type of cleat component 104 for a muddy riding environment and a different type of cleat component 104 for a dry riding environment.

Figure 8:
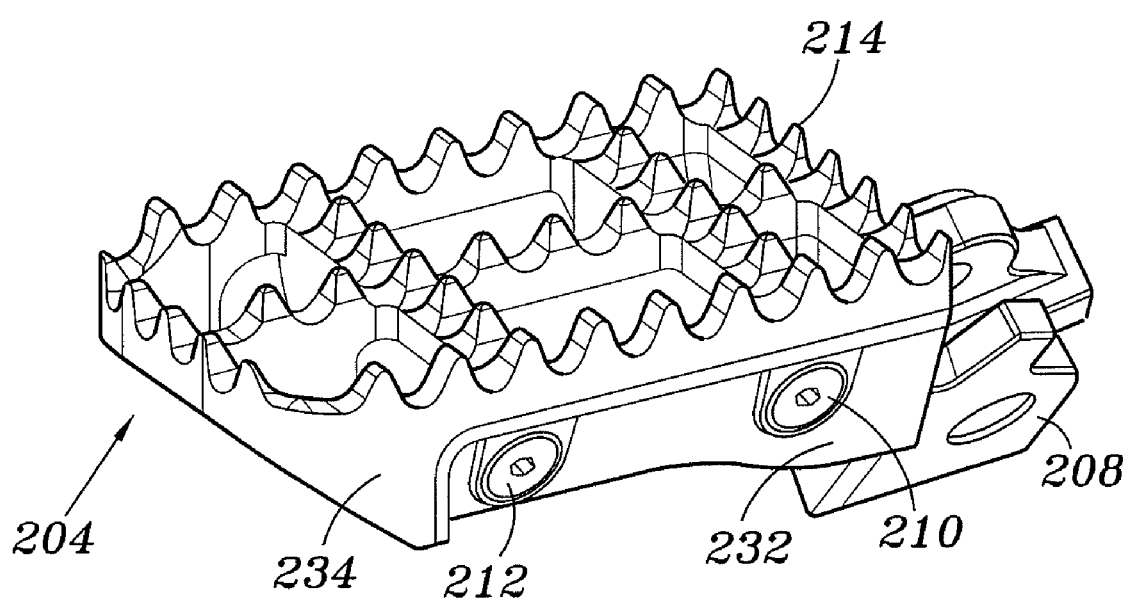
FIG. 8 is a perspective view of an alternative embodiment of a multi-piece foot peg with sloping side supports in accordance with one embodiment of the present invention.
Figure 9:
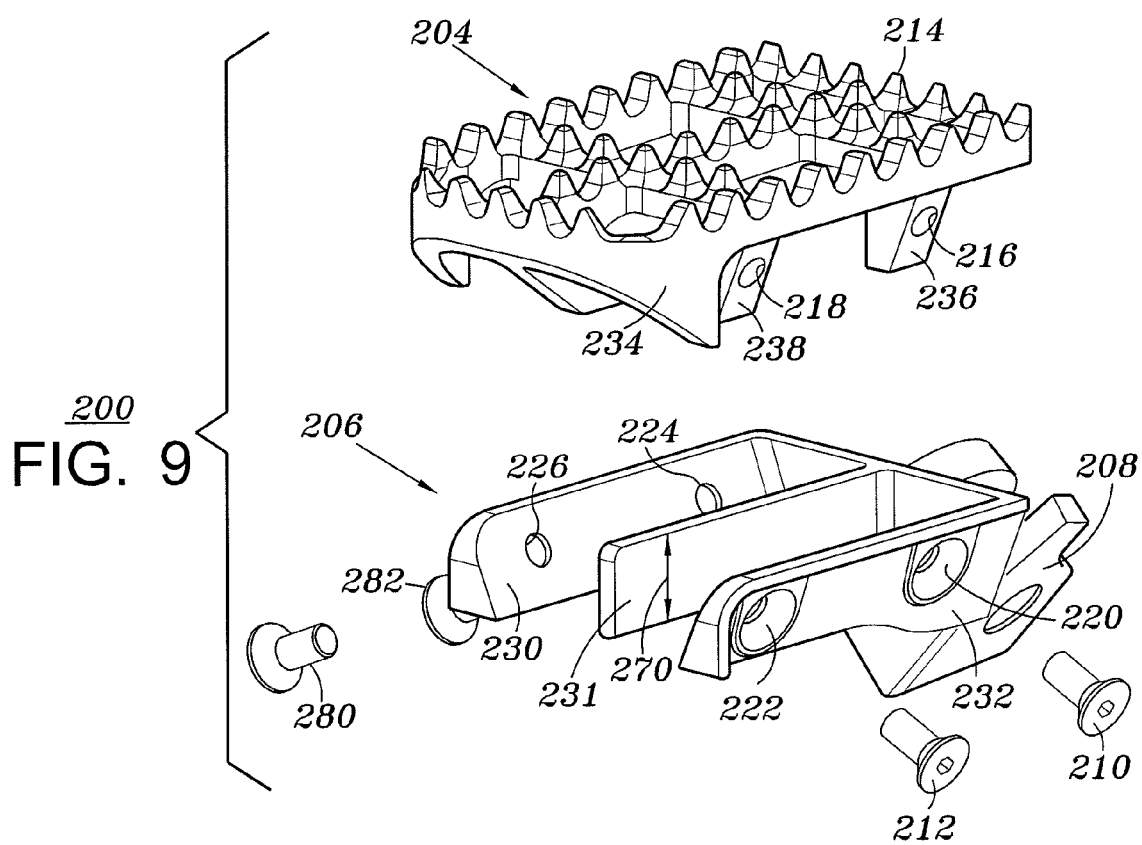
FIG. 9 is an exploded view of an alternative embodiment of the multi-piece foot peg with sloping side supports shown in FIG. 8 in accordance with one embodiment of the present invention.

Turning now to FIGS. 8-9, various views of an alternative embodiment of an exemplary multi-piece foot peg are depicted. In particular, FIG. 8 shows a perspective view of an alternative embodiment of a multi-piece foot peg with inwardly sloping side supports and FIG. 9 shows an exploded view of an alternative embodiment of a multi-piece foot peg with inwardly sloping planar side supports.

In this embodiment, the foot peg 200 again comprises a base component 206 and a cleat component 204 with cleats 214 and lip member 234. Base component 206 comprises a vehicle mounting member 208 similar to that of foot peg 100. However, base component 206 comprises three support members 230-232 (two planar side support members 230 and 232 and a middle support member 231 having a thickness 270) rather than the two side support members 130 and 132 that foot peg 100 depicted in FIGS. 1-7 comprises. Side support members 230 and 232, rather than extending down from the top surface of cleat component 204 in a substantially perpendicular manner from the cleat component 204 as, for example, side support members 130 and 132 depicted in FIG. 1 do, planar side support members 230 and 232 slope inwardly, i.e., in toward each other, as they recede from cleat component 204 as depicted in FIGS. 8 and 9. This may provide additional support for the cleat component 204 as well as aid in placing the cleat component 204 in the proper location when replacing the cleat component 204.

Base component 206 also comprises screw openings 220, 222, 224, and 226 configured to align with screw openings 216 and 218 in cleat attachment members 236 and 238 as well as others not shown in cleat component 204, thus allowing the cleat component 204 to be affixed to base component 206 by means of, for example, screws 210, 212, 280, and 282.

As with foot peg 100, foot peg 200 comprises a cleat component 204 that is removable, thereby allowing characteristics of the foot peg to be modified by simply replacing the cleat component 204 without replacing the entire foot peg. This approach is cheaper and more economical than replacing the entire foot peg. Therefore, if the cleats are worn down and need to be replaced, the cleat component 204 may be replaced without replacing the entire foot peg 200. Furthermore, the characteristics of the foot peg may be quickly and economically changed in response to changing rider preferences and/or ride conditions so as, for example, to adjust the position of the rider on the vehicle by adjusting the thickness of the cleat component 204 through replacement of the cleat component 204 or to adjust the grippability of the cleat component by replacing the cleat component with one having different cleat characteristics Turning now to FIGS. 10A-10C, various views of an exemplary foot peg with pins used for attaching the cleat component to the base component are depicted in accordance with one embodiment of the present invention. Foot peg 300 is identical to foot peg 200 in most respects with like features identified with like reference numerals. However, rather than utilizing screws to attach the cleat component 204 to the base component 206, pins 310, 312, 380, and 382 are utilized. Fasteners 390-393 are attached to respective ones of pins 310, 312, 380, and 382 in order to hold the pins 310, 312, 380, and 382 in place.

Figure 10A:
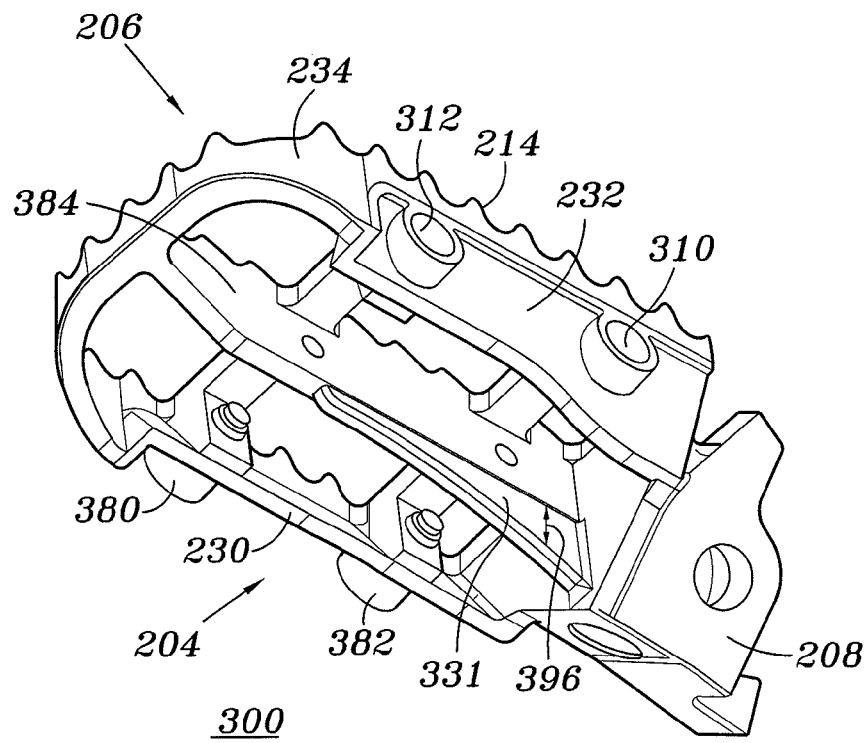
Figure 10B:
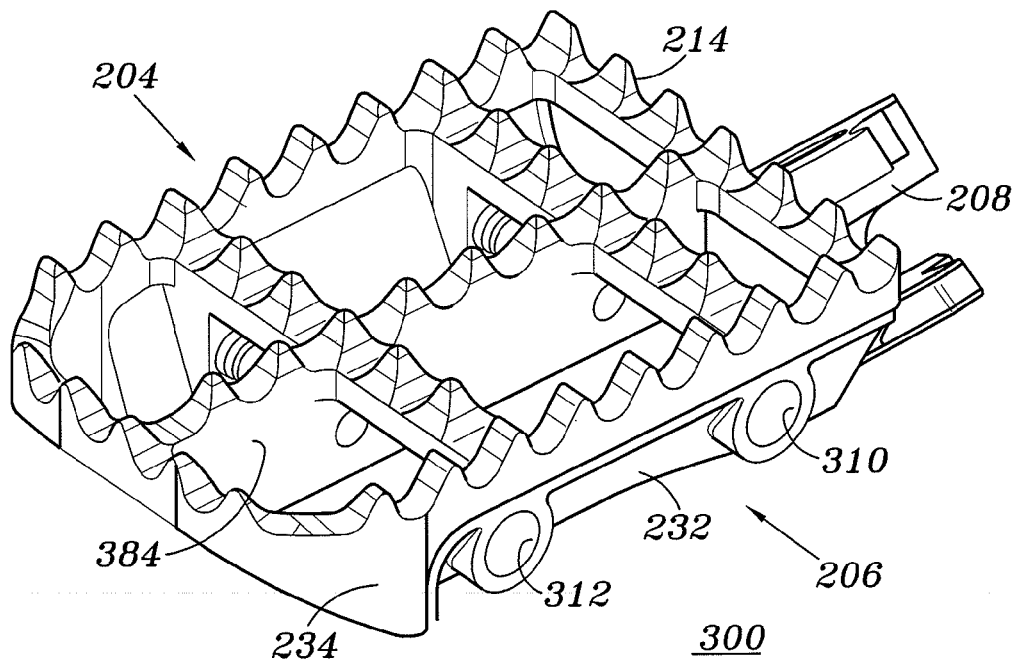

It will also be noticed that the middle support member 331 is tapered such that the thickness 396 varies over the length of the middle support member 331, as shown in FIG. 10A, with a first end that abuts the base subcomponent and a second end more distal from the base subcomponent, such that the middle support tapers so that thickness 396 is longer (or greater) at the first end than it is at the second end. This is in contrast to the middle support member 231 depicted in FIGS. 8-9 which has a thickness 270 that is relatively uniform across the length of the middle support member 231. Thus, many variation of the middle support member are possible. Furthermore, it is possible to have more middle support members than illustrated or to omit the middle support member as with foot peg 100.

Figure 11A:
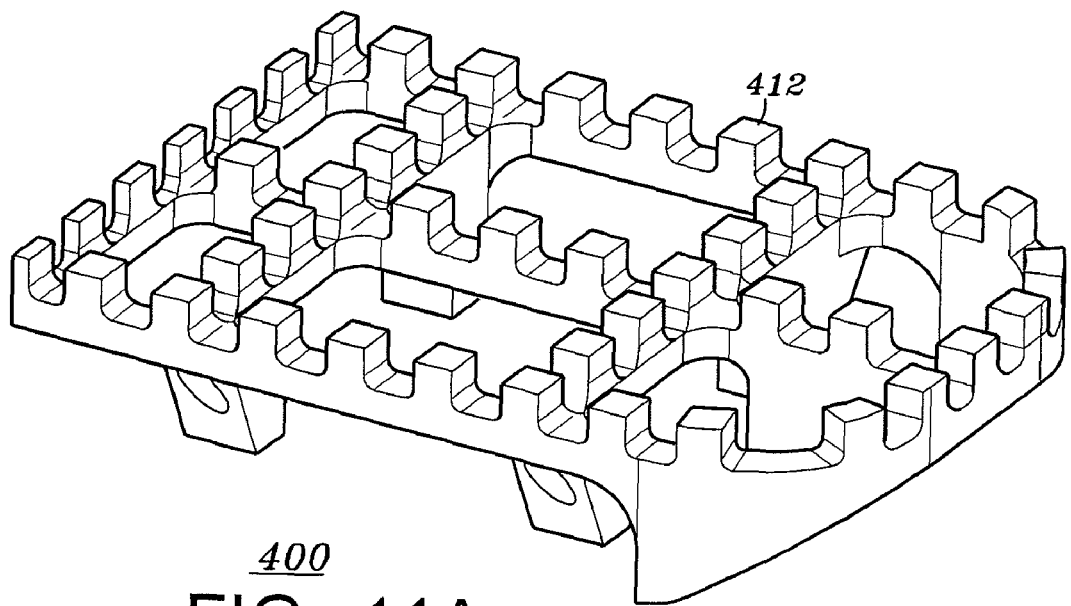
FIG. 11A shows an exemplary cleat component with box like cleats having a substantially flat cleat surface in accordance with one embodiment of the present invention.
Figure 11B:
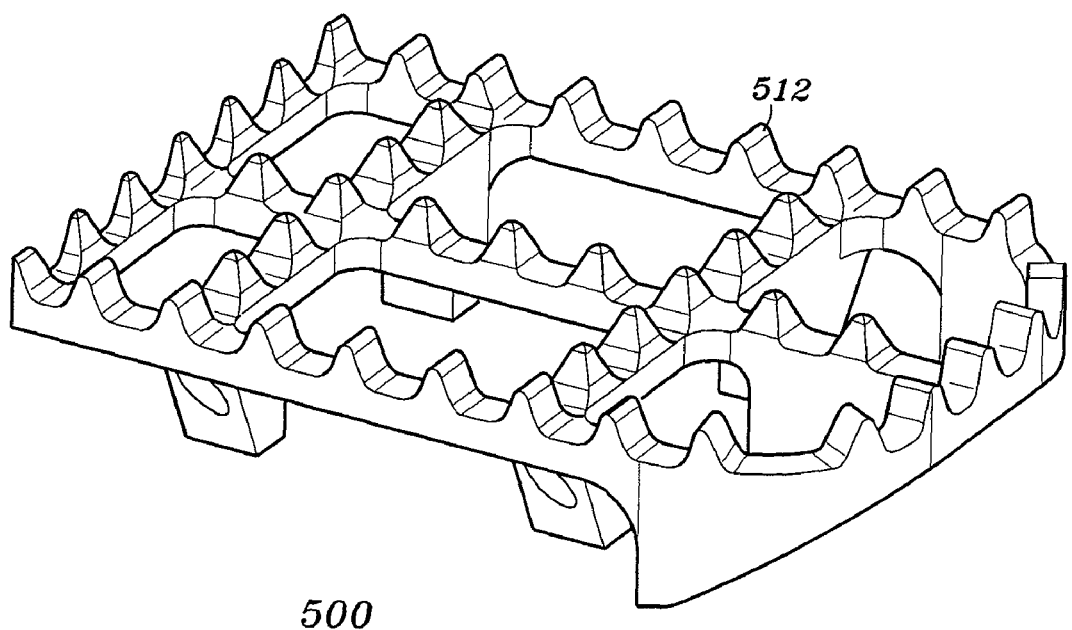
FIG. 11B shows an exemplary cleat component with triangular or pyramidical shaped cleats in accordance with one embodiment of the present invention.

Turning to FIGS. 11A and 11B, two exemplary embodiments of a cleat component with different types of cleats is illustrated. Cleat component 400 illustrated in FIG. 11A comprises cleats 412 that are substantially cubical or box like with each having a substantially flat top surface. In contrast, cleat component 500 illustrated in FIG. 11B comprises cleats 512 that are substantially more pointed having a shape that resembles a pyramid or triangle shape. Either of cleat components 400 or 500 may be substituted for cleat component 204 depicted in FIGS. 8-9. Thus, a rider may replace one type of cleat component with a different type of cleat component without replacing the entire foot peg, thereby allowing a rider to economically adjust the cleat style of the foot peg to meet the rider's preferences and/or riding conditions.

Figure 12A:
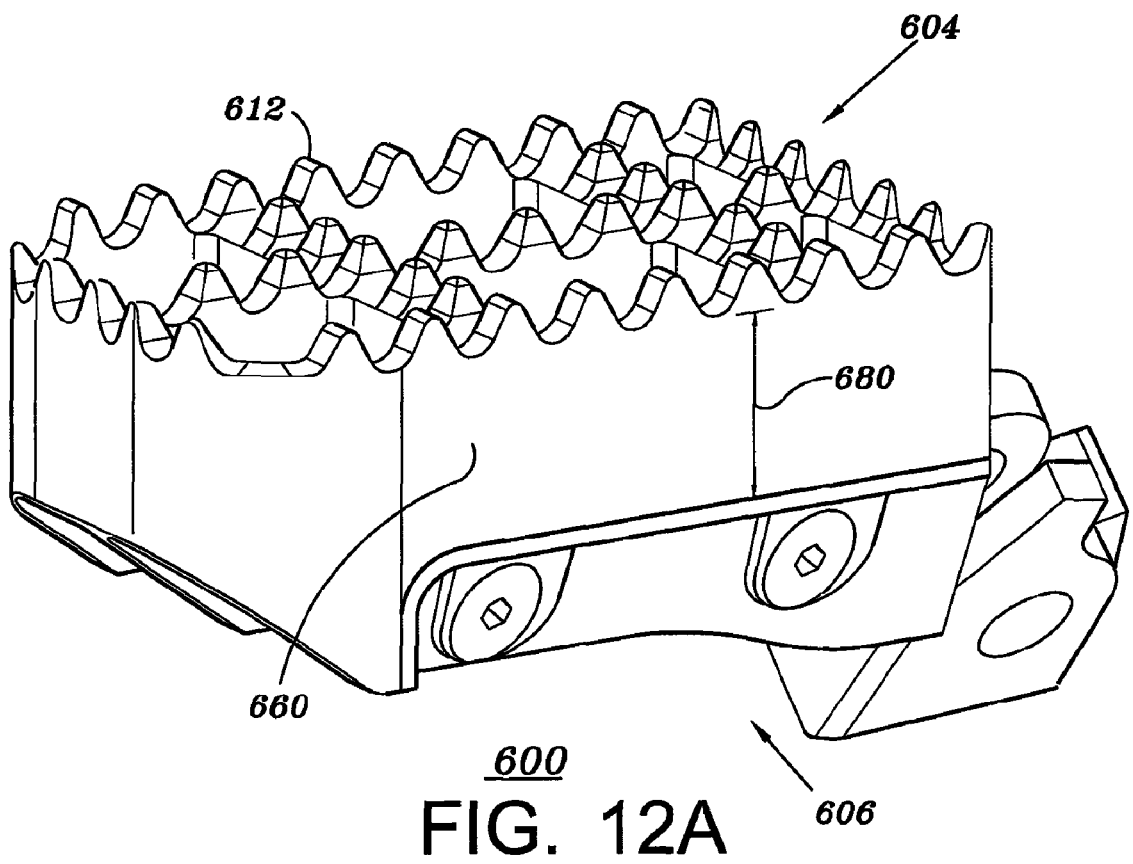
FIGS. 12A and 12B show two exemplary embodiments of a foot peg illustrating cleat components with different thicknesses.
Figure 12B:
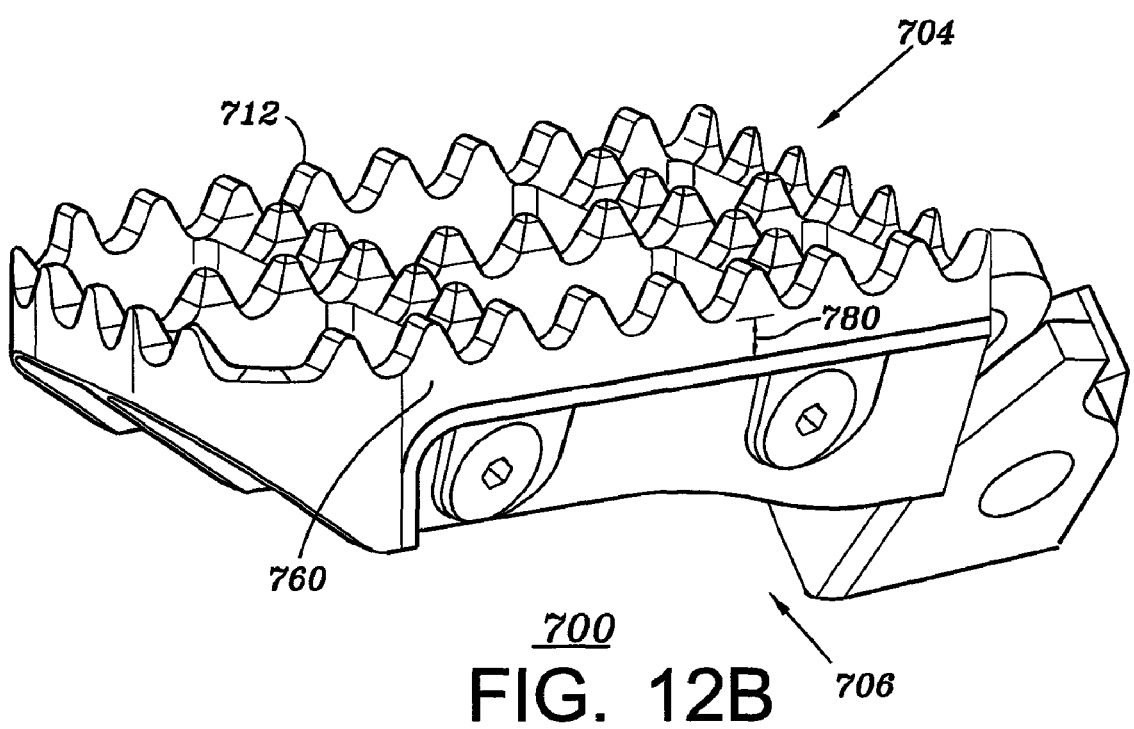

Turning now to FIGS. 12A and 12B, two exemplary embodiments of a foot peg illustrating cleat components with different thicknesses are shown. Foot peg 600 comprises a base component 606 and a cleat component 604 with cleats 604. Foot peg 700 also comprises a base component 706 and a cleat component 704 with cleat 712. However, the thickness 680 of the portion of the cleat component 604 beneath the cleats 612 (referred to herein as the cleat base 660) for foot peg 600 is greater than the thickness 780 of the portion of the cleat component 704 beneath the cleats 712 (referred to herein as the cleat base 760) for foot peg 700. However, the base components 606 and 706 for the two foot pegs 600 and 700 are identical as is the cleat style for both foot pegs 600 and 700. Therefore, a the cleat component 604 may be replaced with cleat component 704 allowing the rider to adjust the height of the foot peg to suit rider preferences without replacing the entire foot peg.

Thus, cleat components 604 or 704 may be provided in a variety of thicknesses (or heights), thereby allowing the height of the foot peg to be adjusted without replacement of the entire foot peg, but merely by replacing the cleat component 604 or 704 with a different type cleat component. It is also clear that the thickness (or height) of the cleat component may be varied without varying the size and shape of the cleats at the top of the cleat component, but by merely varying the thickness of the cleat base 660 and 760 in various cleat components. Thus, a rider may replace a cleat component with a different cleat component in order to change the rider height on the vehicle without changing the cleat pattern, size, or shape. Thus, a newly replaced cleat component may be identical to a previous cleat component in all aspects except for the difference in thickness of the cleat base 660 or 760.

It is apparent, therefore, that the cleat component for the foot peg of the present invention may be replaced to, for example, adjust rider positioning on a vehicle by adjusting the thickness of the cleat component with or without changing cleat style; adjust cleat style with, for example, different shaped cleats, different height of cleats, and/or different pattern of cleats; and to replace a worn or eroded cleat component with an unworn cleat component.

Furthermore, it will be appreciated that many other shapes for cleats and arrangement of cleats may be utilized other than those described herein without departing from the scope or spirit of the present invention. For example, the cleats may be pyramidical, conical, or cubical and have rounded or sharp edges. Furthermore, the valleys between successive cleats may have rounded or sharp edges and have a mirroring shape to that of the cleats or may have an entirely different shape. It should also be noted that the cleat component is not limited to cleats all having the same shape or height, but that cleats with different shapes and/or different heights may be incorporated into a single cleat component. Additionally, the arrangement of cleats is not limited to rows of cleats that are substantially parallel or perpendicular to each other as described and depicted, but may include many other possible arrangements, for example, the arrangement of cleats may form an "X" pattern or may be arranged in arcs or other circular shapes.

Figure 13A:
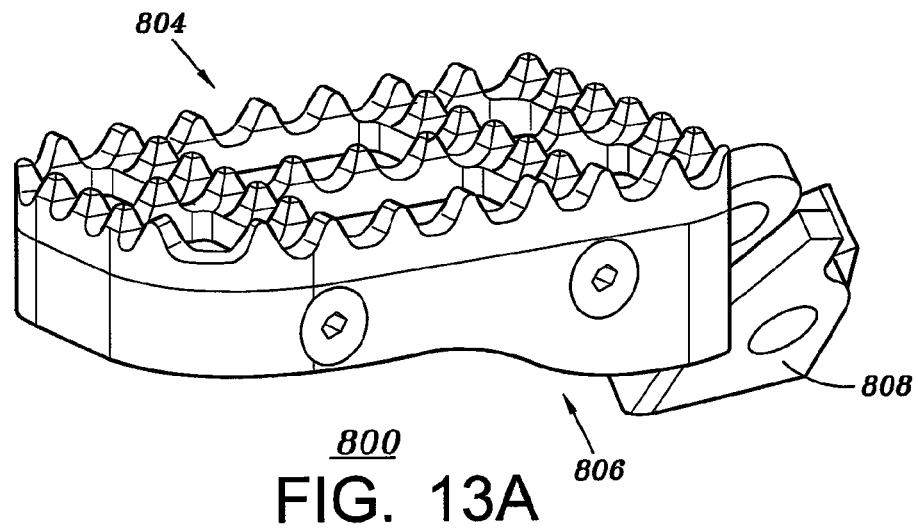
FIGS. 13A-13C show various views of an exemplary foot peg with replaceable cleat with a closed loop base component in accordance with one embodiment of the present invention.
Figure 13B:
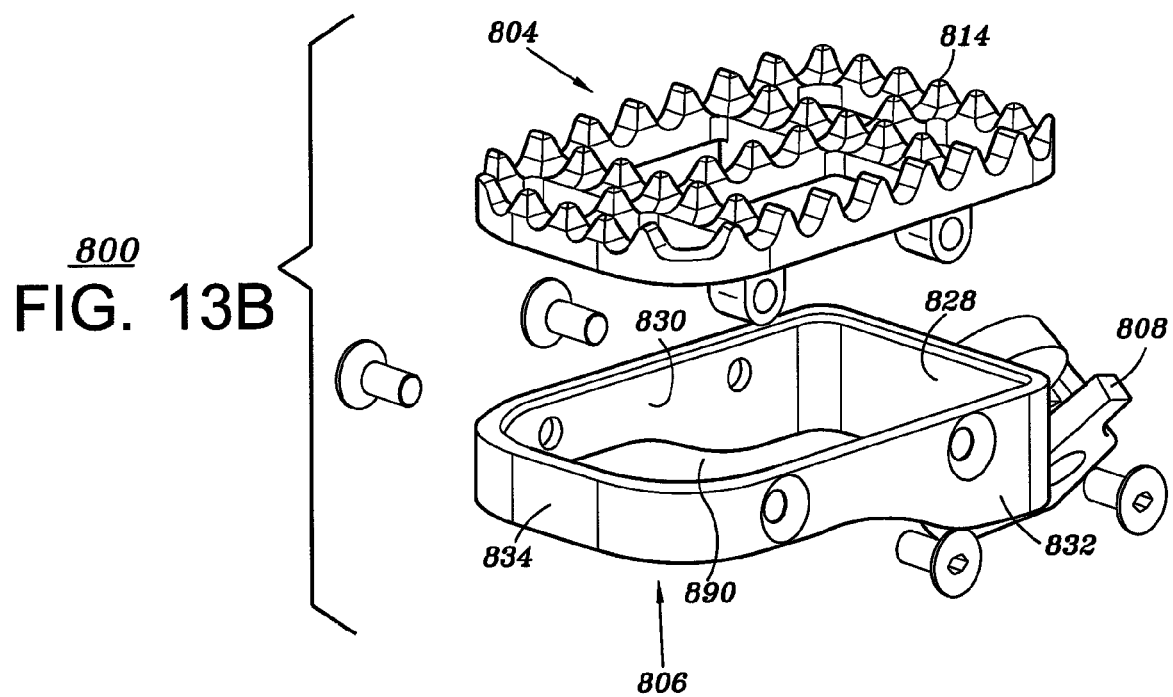
Figure 13C:
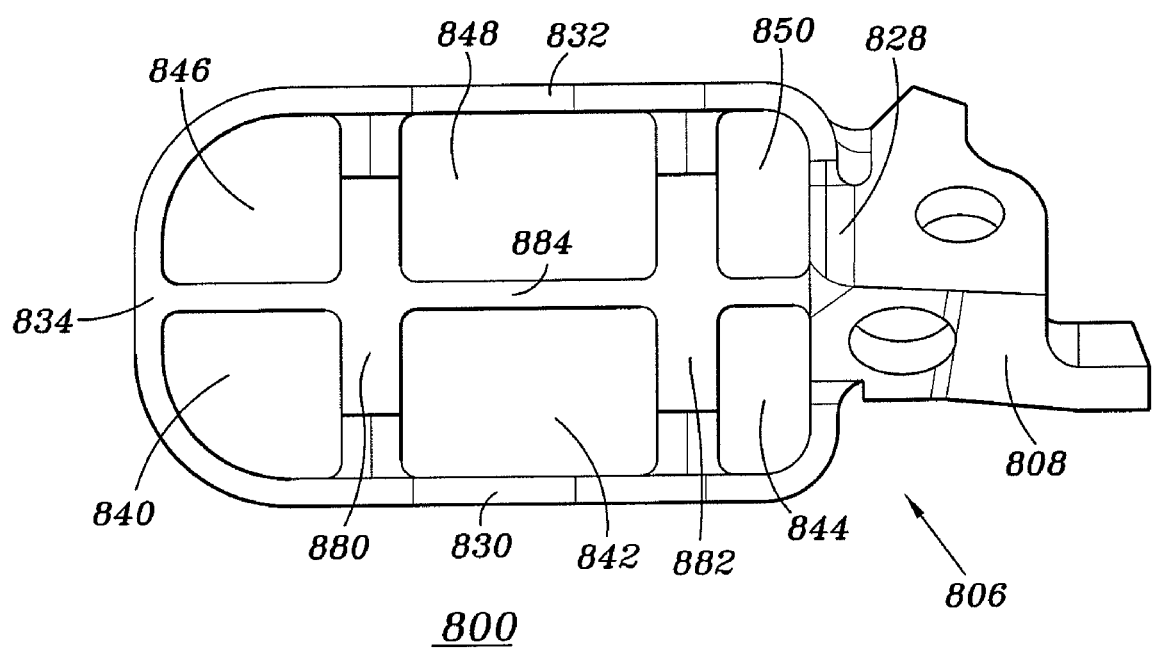

Turning now to FIGS. 13A-13C, various views of an exemplary foot peg with replaceable cleat with a closed loop base component is shown in accordance with one embodiment of the present invention. FIG. 13A shows a perspective view of an exemplary foot peg with a closed loop base component in accordance with one embodiment of the present invention. FIG. 13B shows an exploded perspective view of an exemplary foot peg with a closed loop base component in accordance with one embodiment of the present invention and FIG. 13C shows a bottom view of an exemplary foot peg with a closed loop base component in accordance with one embodiment of the present invention.

As with other foot pegs described above, foot peg 800 includes a base component 806 having an vehicle mounting member 808 and a cleat component 804. However, in contrast to many of the other embodiments of the present invention, foot peg 800 includes a base component 806 that has a defines an open space 890 enclosed on four sides rather than three. Thus, base component 806 includes first and second side support members 830 and 832, end support member 834, and base support member 828 that are connected to each other such that an open space 890 is defined between first and second side support members 130 and 132 and between end support member 834 and base support member 828. Base support member 828 also connects the first and second side support members 830 and 832 to a vehicle mounting member 808.

The cleat component 804 comprises a plurality of cleats 814 arranged over the top surface of the cleat component 804 such that support for a rider's foot is provided. Open spaces 840, 842, 844, 846, 848, and 850 are provided between various ones of the plurality of cleats 814 and are defined by cleat cross members 880, 882, and 884. Open spaces 840, 842, 844, 846, 848, and 850 are of a sufficient size such that debris from a rider's foot or elsewhere may fall through the open spaces 840, 842, 844, 846, 848, and 850 and through the opening between first and second side support elements 830 and 832 and end support element 834 and base support element 828 thereby preventing or inhibiting the buildup of debris on the top surface of the foot peg 800 such that a better surface for supporting a rider is provided. In some embodiments, at least one dimension defining the area of an open space such as, for example, one of open spaces 840, 842, 844, 846, 848, and 850, is greater than or equal to approximately ¼ inch in order to provide ample room for debris to fall through. The shape of open spaces 840, 842, 844, 846, 848, and 850 may be varied and may encompass many different shapes including but not limited to the shapes depicted in FIG. 8.

Figure 14:
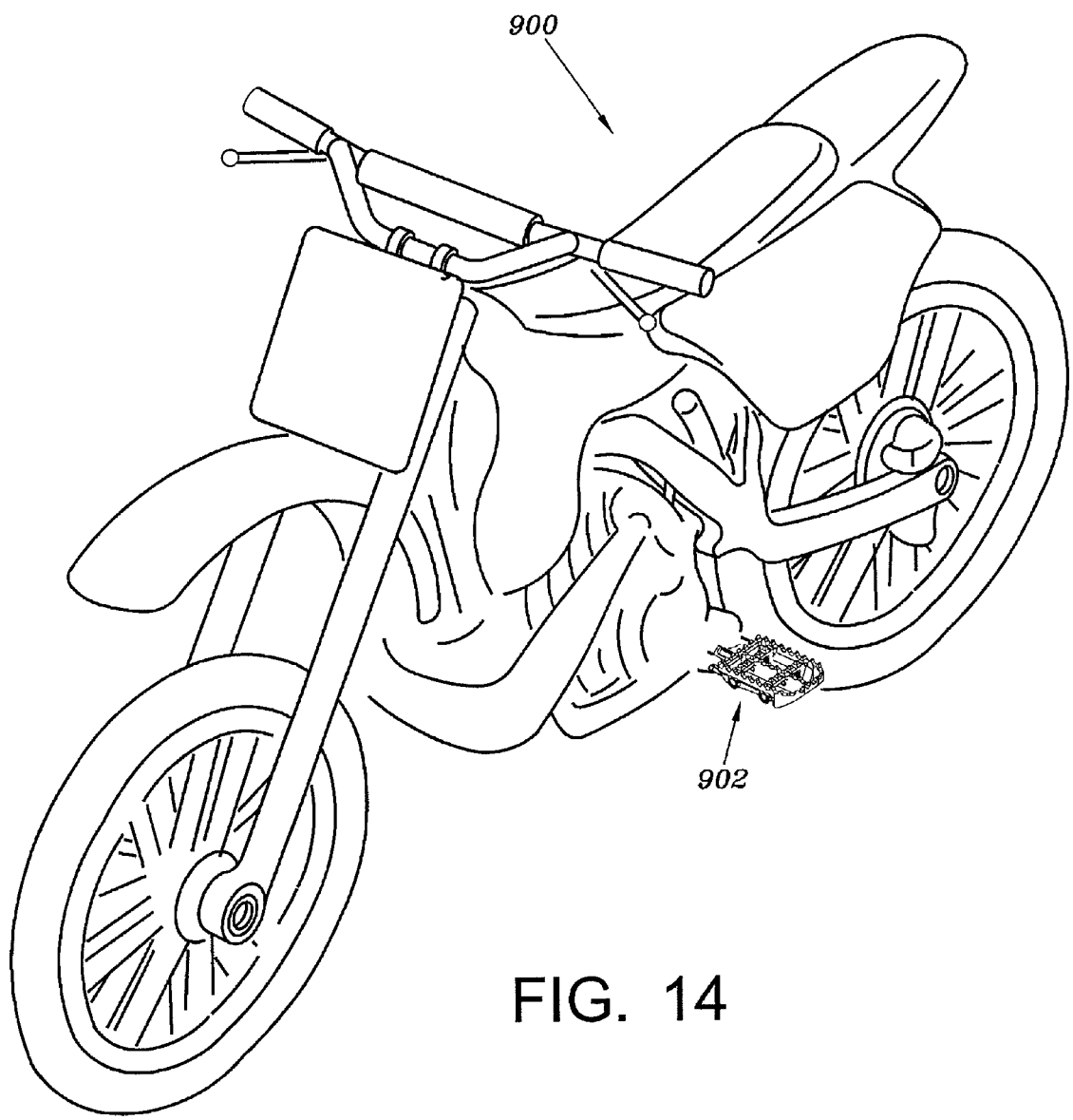
FIG. 14 shows an exemplary motorcycle with a foot peg in accordance with one embodiment of the present invention.

Turning now to FIG. 14, various vehicles on which the foot peg of the present invention may be utilized are depicted in accordance with various embodiments of the present invention. FIG. 14 shows an exemplary motorcycle 900 with a foot peg 902 in accordance with one embodiment of the present invention. Foot peg 902 may be implemented as, for example, any of foot pegs 100, 200, 300, 600, or 700 as described above and illustrated in the various figures. Similarly, any of foot pegs 100, 200, 300, 600, or 700 as described above and illustrated in the various figures may be may be used in conjunction with similar machines such as a three wheel or four wheel all terrain vehicle (ATV) commonly known to one of ordinary skill in the art.

It will be appreciated that the foot peg of the present invention may be fabricated from a variety of materials. In some embodiment, the foot peg will be constructed from a metal or carbon composite material. Furthermore, in some embodiments, the cleat component may be fabricated from a different material from that of the base component. For example, in some embodiments, the base component may be either a die cast or forging of titanium or stainless steel while the cleat component may be fabricated from aluminum, anodized aluminum or a carbon composite material.

In some embodiments, the dimensions of the cleat surface may be in the range of 70-90 mm by 50-70 mm. However, other size surfaces are also possible. The cleats may be offered in varying degrees of "sharpness" or "grip" from mild to aggressive to allow the rider to suit his preference or adjust to local riding conditions. Cleat heights may be, for example, in a range from ¹⁄₁₆" to 1" tall to offer the rider a custom fit. However, other heights are also possible as those skilled in the art will recognize.

It should be noted that although the foot peg has been described primarily with reference to embodiments in which the base component has an open end, such as the horseshoe shape depicted in FIGS. 1-7 or the "E" or "pitchfork" shape depicted in FIGS. 8-10C, that closed end embodiments are also possible such that the base component comprises, for example, a circular or oblong shape that defines an opening for debris to fall through. Those skilled in the art will recognize that many different open and closed end shapes are possible and as such the present invention is not limited to embodiments in which the base component is shaped as described in any particular Figure herein.

To aid the Patent Office, and any readers of any patent issued on this application in interpreting the claims appended hereto, it is noted that applicant does not intend any of the appended claims to invoke paragraph 6 of 35 U.S.C. §112 as it exists on the date of filing unless the words "means for" are used in the particular claim. Furthermore, none of the description in the present application should be read as implying that any particular element, step, or function is an essential element which must be included in the claim scope: THE SCOPE OF THE PATENTED SUBJECT MATTER IS DEFINED ONLY BY THE ALLOWED CLAIMS. Thus, the extent of legal protection will be determined by the limitations recited in the allowed claims and their equivalents.

Unless explicitly recited, other aspects of the present invention as described in this specification do not limit the scope of the claims.

As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Furthermore, no element described herein is required for the practice of the invention unless expressly described as "essential" or "critical".

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A foot peg for use on motorcycles and all terrain vehicles, comprising:
    a base component having a first base subcomponent, a separate second base subcomponent, and a separate third base subcomponent spaced apart from the second base subcomponent, wherein the first base subcomponent is configured to attach the base component to a vehicle, the separate second and third base subcomponents, respectively, extend from the first base subcomponent away from the vehicle, such that the second and third base subcomponents define a space between the second and third base subcomponents to allow debris to fall there through; and
    a cleat component comprising a plurality of cleats to provide a surface upon which a rider may place a foot and an attaching subcomponent for attaching the cleat component to the base component, wherein the plurality of cleats are arranged such that at least one opening is defined between the plurality of cleats, wherein the opening allows debris to pass therethrough, wherein at least a portion of the opening aligns with the space between the second and third base subcomponents such that debris falling through the opening also falls through the space, and wherein the cleat component may be replaced without removal of the base component from the vehicle.

2. The foot peg as recited in claim 1, wherein the base component is fabricated from a different type of material from that of the cleat component.

3. The foot peg as recited in claim 2, wherein the cleat component material comprises a less dense material than does the base component material.

4. The foot peg as recited in claim 1, wherein the base component comprises at least one of a metal, a carbon composite, and combinations thereof.

5. The foot peg as recited in claim 1, wherein the cleat component comprises a metal, a carbon composite, or a combination thereof.

6. The foot peg as recited in claim 1, wherein the cleat component attaches to the base component by use of at least one of a bolt, a screw, and a pin.

7. The foot peg as recited in claim 1, wherein the cleat component is configured to mechanically couple to the base component.

8. The foot peg as recited in claim 1, wherein the cleat component comprises one of anodized aluminum and a carbon composite material.

9. The foot peg as recited in claim 1 wherein the base component comprises one of titanium and stainless steel.

10. A power sport vehicle, comprising:
    a mounting member for attachment to the vehicle;
    a foot peg for attachment to the mounting member;
    wherein the foot peg comprises a base component and a cleat component and wherein
        the base component has a separate first base subcomponent, a separate second base subcomponent, and a separate third base subcomponent spaced apart from the second base subcomponent, wherein the first base subcomponent is configured to attach the base component to the vehicle, the separate second and third base subcomponents each extend from the first base member away from the vehicle, such that the second and third base subcomponents define a space between the second and third base subcomponents to allow debris to fall there through; and
        the cleat component comprises a plurality of cleats to provide a surface upon which a rider may place a foot and an attaching subcomponent for attaching the cleat component to the base component, wherein the plurality of cleats are arranged such that at least one opening is defined between the plurality of cleats, wherein the opening allows debris to pass there through, wherein at least a portion of the opening aligns with the space between the second and third base subcomponent such that debris passing through the opening passes through the space, and wherein the cleat component may be replaced without removal of the base component from the vehicle.

11. The vehicle as recited in claim 10, wherein the base component is fabricated from a different type of material from that of the cleat component.

12. The vehicle as recited in claim 11, wherein the cleat component material comprises a less dense material than does the base component material.

13. The vehicle as recited in claim 10, wherein the base component comprises at least one of a metal, a carbon composite, and combinations thereof.

14. The vehicle as recited in claim 10, wherein the cleat component comprises a metal, a carbon composite, and combinations thereof.

15. The vehicle as recited in claim 10, wherein the cleat component attaches to the base component by use of at least one of a bolt, a screw, and a pin.

16. The vehicle as recited in claim 10, wherein the cleat component is configured to mechanically couple to the base component.

17. The vehicle as recited in claim 10, wherein the vehicle comprises one of a motorcycle and an all terrain vehicle.

18. The vehicle as recited in claim 10, wherein the cleat component comprises one of anodized aluminum and a carbon composite material.

19. The vehicle as recited in claim 10, wherein the base component comprises at least one of titanium and stainless steel.

20. A foot peg for use on motorcycles and all terrain vehicles, comprising:
    a base component having:
        a base subcomponent configured to attach the base component to a vehicle, spaced apart and separate first and second side support members each having at least one lateral opening for receiving a fastener, and at least one separate middle support member disposed between said first and second side support members, wherein the first, second and at least one middle side support members separately extend from the first base subcomponent; and a removable cleat component having:

a fixed plurality of cleats having an irregular a surface upon which a rider may place a foot wherein the cleat surface includes at least one plurality of geometric shapes comprising substantially triangular or substantial rectangular, and at least one attaching subcomponent extending from the bottom of the cleat component having lateral openings configured for alignment with the at least one first and second side support lateral opening, respectively, wherein the fixed plurality of cleats are arranged such that at least one opening is defined between the fixed plurality of cleats, and at least a portion of the opening aligns with at least one of the spaces between the at least one middle support member and the first or second side support members, respectively, and wherein the middle support member abuts at least a portion of said removable cleat component;

wherein the cleat component may be replaced without removal of the base component from the vehicle.

21. The foot peg of claim 20, wherein the middle support member includes a first end abutting the base subcomponent, a second end, and a tapering thickness between the first and second ends such that the first end has a thickness greater than the second end.

22. The foot peg of claim 20 or claim 21, wherein the first and second side support members comprise inwardly sloping facing planar surfaces, wherein said surfaces are configured to abut at least a portion of said removable cleat component.

23. The foot peg of claim 22, wherein the at least one attaching subcomponent further includes a sloped outer surface for abutment against one of the first or second inwardly facing surface.

24. The foot peg of claim 20, wherein the cleat component further comprises a lip member.

25. The foot peg of claim 24, wherein the lip member extends outwardly and downwardly over ends of the first and second side support members.

26. A foot peg for use on motorcycles and all terrain vehicles, comprising:

a base component having:

a base subcomponent configured to attach the base component to a vehicle, and spaced apart and separate first and second side support members each having at least one lateral opening for receiving a fastener, wherein the first and second side support members extend from the first base subcomponent away from the vehicle; and a removable cleat component having:

a fixed plurality of cleats having a surface upon which a rider may place a foot, and at least one attaching subcomponent extending from the bottom of the cleat component having lateral openings configured for alignment with the at least one first and second side support lateral openings, respectively, wherein the fixed plurality of cleats are arranged such that at least one opening is defined between the fixed plurality of cleats, and wherein the cleat component may be replaced without removal of the base component from the vehicle.

27. The foot peg of claim 26, wherein the cleat surface includes at least one plurality of geometric shapes.

28. The footpeg of claim 27, wherein the at least one plurality of geometric shapes is one of pyramidical, rectangular, conical, or cubical.

* * * * *